March 1, 1938.    C. H. ROBB    2,109,709
BRAKE
Filed June 5, 1936    2 Sheets-Sheet 1
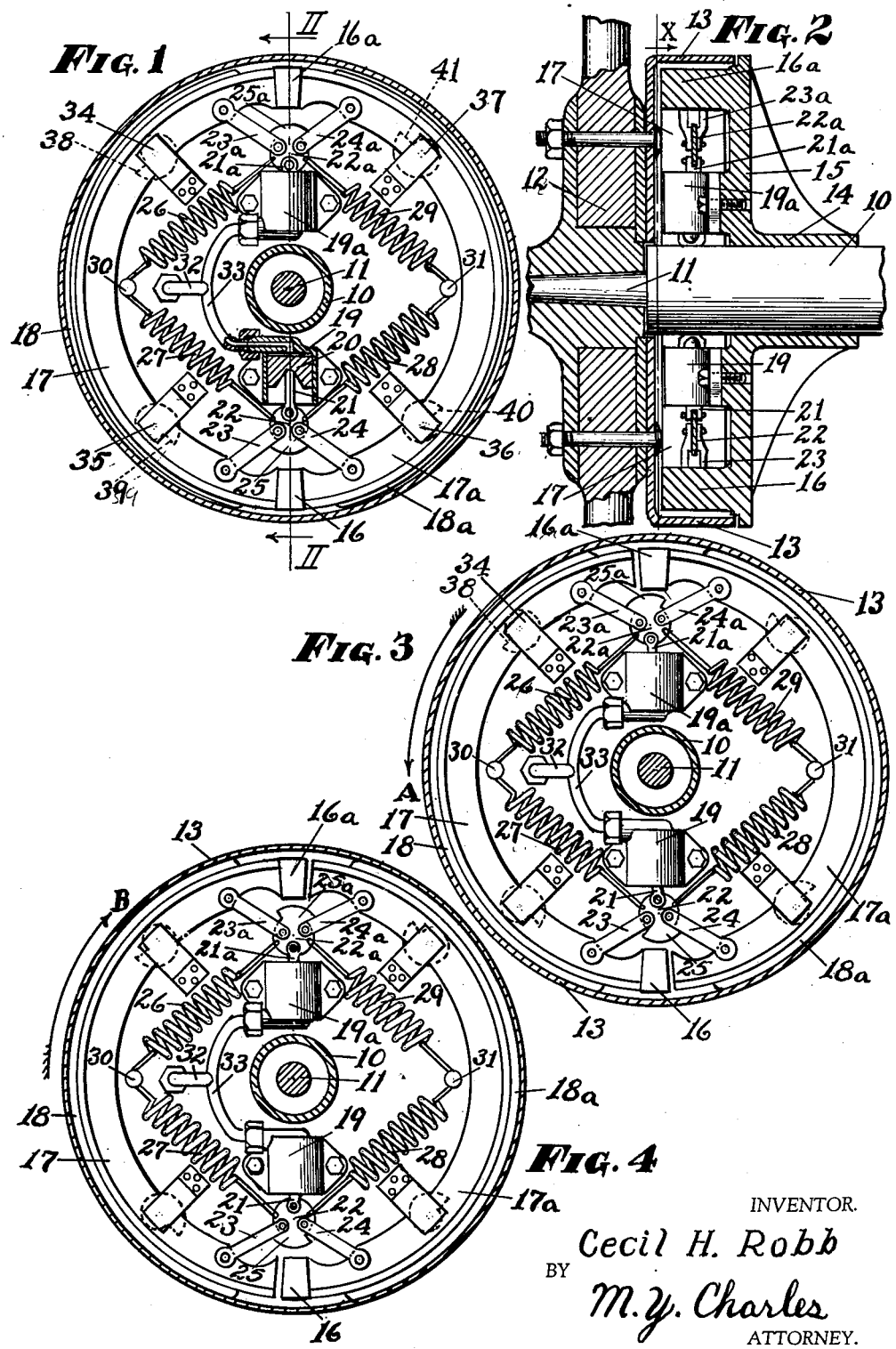
INVENTOR.
Cecil H. Robb
BY M. Y. Charles
ATTORNEY.

March 1, 1938.　　　　C. H. ROBB　　　　2,109,709
BRAKE
Filed June 5, 1936　　　2 Sheets-Sheet 2
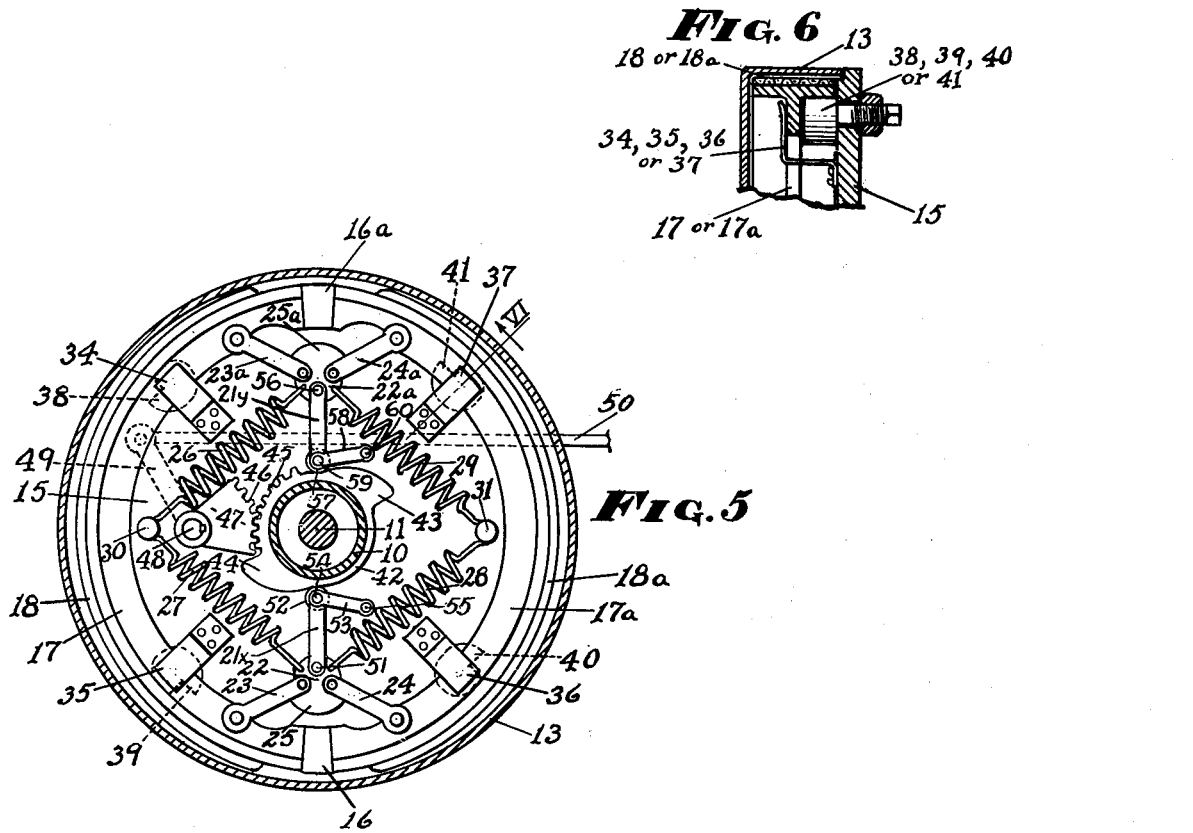
INVENTOR.
Cecil H. Robb
BY M. G. Charles
ATTORNEY.

Patented Mar. 1, 1938

2,109,709

UNITED STATES PATENT OFFICE 2,109,709

BRAKE

Cecil H. Robb, Moundridge, Kans., assignor of one-fourth to John W. Pribble, McPherson, Kans.

Application June 5, 1936, Serial No. 83,652

2 Claims. (Cl. 188—78)

My invention relates to an improvement in brakes, and refers more particularly to the mounting and suspension of the brake shoes. In the drawings, my invention is shown as being applied to the hydraulic type of brakes, although it will be understood that the invention is also applicable to mechanically operated brakes as well as the hydraulic brakes.

Usually brake shoes are pivotally mounted on a housing plate adjacent the brake drum on the wheel and this sort of mounting only permits a small portion of the brake lining on the brake shoes to actually contact the brake drum in effective braking position.

In view of this objection to the present type of brakes, I have provided my improved brake in which the brake shoes are floatingly suspended on springs and slidably held in operable position by the usual slide guide, adjusting cams, etc., whereby the entire braking surface of the brake shoe may engage the brake drum and thereby effect a more efficient brake, the brake lining will wear longer and the braking operation will be performed with much less power.

Now referring to the drawings, Fig. 1 is a sectional view through a brake drum, showing the working parts of my improved brake device.

Fig. 2 is a sectional view through my brake device and associated parts as seen from the line II—II in Fig. 1.

Fig. 3 is a sectional view, the same as seen in Fig. 1, except the brake drum is revolving in the direction of the arrow A and the brake shoes are set in braking position.

Fig. 4 is a sectional view through the brake drum, the same as seen in Fig. 1, except the brake drum is revolving in the direction of the arrow B and the brake shoes are in braking position.

Fig. 5 is a sectional view through a brake drum showing a modified form of the working parts of my improved brake device.

Fig. 6 is a cross sectional view taken along the line VI—VI in Fig. 5 and showing the cam adjustment device for the brake shoes.

Similar numerals of reference designate the same parts throughout the several figures of the drawings.

In the drawings is shown an axle housing 10, from which the drive axle 11 projects and on which is rigidly mounted the wheel 12 to which is rigidly attached the brake drum 13.

Rigidly attached to the axle housing 10 is a sleeve like element 14 on which is integrally formed a disc like portion 15, on which is mounted the brake mechanism. Integrally formed on the element 15, are projecting elements 16 and 16a, which are diametrically positioned on the element 15 and function as stop elements for the brake shoes as will later be explained. At 17 and 17a are brake shoes having linings 18 and 18a, the outer face of which is curved and has the same radius as the inner face of the brake drum 13.

On the element 15 is rigidly mounted a pair of cylinders 19 and 19a, having pistons such as 20, which are adapted to exert pressure in opposite directions and piston rods 21 and 21a being seated in the pistons as shown in the piston 20 are pivotally connected to compensating elements 22 and 22a. At 23 and 24 are link elements, one end of which is pivotally connected to the element 22 and the outer ends of the elements 23 and 24 are pivotally connected to the lower ends of the brake shoes 17 and 17a. Similarly at 23a and 24a are link elements, one end of which is attached to the compensating element 22a and the outer ends of the link elements 23a and 24a are pivotally connected to the upper ends of the brake shoes 17 and 17a. The compensating elements 22 and 22a are provided with tail like elements 25 and 25a, the edges of which engage the links 23 and 24; and 23a and 24a, when the brake shoes 17 and 17a are in a non-braking position as shown in Fig. 1.

At 26, 27, 28 and 29 are spring elements, one end of the springs 26 and 27 being attached to a pin element 30 which is rigidly attached to the element 15. The outer end of the spring element 26 is attached to the compensating element 22a and the other end of the spring element 27 is attached to the compensating element 22. Similarly one end of the springs 28 and 29 are attached to a pin element 31 which is rigidly mounted on the element 15 and the other end of the spring 29 is connected to the compensating element 22a, also the other end of the spring 28 is connected to the compensating element 22.

At 32 is a feed pipe connecting to a pipe 33, the ends of which are connected with the cylinders 19 and 19a in such a manner as to feed liquid under pressure into said cylinders and thereby cause the pistons therein to exert pressure in an outwardly direction for purposes that will later be described.

At 34, 35, 36 and 37 are elements rigidly attached to the element 15 and function as slides in which the brake shoes may operate. At 38, 39, 40 and 41 are indicated the conventional cam like device commonly employed in adjusting the clearance of the brake shoes from the brake drum.

From the foregoing described structure, it is obvious that the brake shoes 17 and 17a are suspended in a non-braking position in the slide elements 34, 35, 36 and 37 by the spring elements 26, 27, 28 and 29 through the medium of the link elements 23 and 24, and 23a and 24a.

In Fig. 5 is illustrated a modified form of the mechanism that operates the brake shoes. The device takes the place of the hydraulic cylinders and piping above described and comprises a cam element 42 that is revolvably mounted on the axle housing 10. The element 42 is provided with a pair of cam portions 43 and 44 that are positioned diametrically across the element 42. On the element 42 are teeth 45 that are in mesh with teeth 46 of a gear segment 47 that is rigidly mounted on one end of a shaft 48 that is revolvably mounted in the element 15. On the other end of the shaft 48 is rigidly mounted a lever arm 49 to which is connected an operating rod 50.

At 21x and 21y are push rods, which are the equivalent of the piston rods 21 and 21a in Fig. 1. One end of the rod 21x is pivotally attached at 51 to the compensating element 22, the other end of the rod 21x is provided with a roller 52 which bears against the cam elements 42 and 44. At 53 is a link element one end of which is pivotally connected at 54 to the rod 21x, the other end of the link 53 is pivotally connected at 55 to the plate element 15.

Similarly, one end of the push rod 21y is pivotally connected at 56 to the compensating element 22a. The other end of the push rod 21y is provided with a roller 57 that bears against the cam elements 42 and 43. At 58 is a link element, one end of which is pivotally connected at 59 to the push rod 21y, the other end of the link 58 is pivotally connected at 60 to the plate element 15.

The operation of the device is as follows; Referring to Fig. 3, the brake drum 13 is travelling in the direction of the arrow A. The brake is applied by liquid pressure being forced through the tubes 32 and 33 to the cylinders 19 and 19a whereupon the pistons are forced outwardly in opposite directions and through the medium of the compensating elements 22 and 22a, and the link elements 23 and 24, and 23a and 24a, the brake shoes 17 and 17a are forced in opposite horizontal directions, whereupon the entire face of the brake linings 18 and 18a engage the brake drum 13 for braking purposes.

Attention is called to the fact that at the time of engagement of the brake lining with the brake drum, the brake shoes have been forced apart and there is a clearance between the ends of the brake shoes and the stop elements 16 and 16a, and due to the engagement of the brake lining with the brake drum, the brake shoes are naturally carried in the direction of the arrow A, until the lower end of the brake shoe 17 engages the stop element 16 and the upper end of the brake shoe 17a engages the stop element 16a and due to this movement, the compensating elements 22 and 22a have rocked to the position shown in Fig. 3 to compensate for the movement just described, and the tail elements 25 and 25a have engaged the link elements 23a and 24, so that further pressure from the cylinders 19 and 19a will result in a further outward movement of the brake shoes 17 and 17a for increasing braking effect on the brake drum 13.

Upon the release of the hydraulic pressure in the cylinders 19 and 19a, the brake shoes 17 and 17a will return to their original nonbraking position as shown in Fig. 1 because of the forces produced by the springs 26, 27, 28 and 29.

Now referring to Fig. 4, the brake drum 13 is revolving in the direction of the arrow B. Now by exerting hydraulic pressure through the tubes 32 and 33 to the cylinders 19 and 19a, the pistons therein are forced outwardly in opposite directions whereupon the brake shoes 17 and 17a are again forced outwardly in opposite horizontal directions to a point where the entire face of the brake linings 18 and 18a engage the brake drum 13. Again there is a clearance produced between the ends of the brake shoes and the stop elements 16 and 16a and by reason of the direction of travel of the brake drum the brake shoes are carried in a clockwise direction to a point where the lower end of the brake shoe 17a engages the stop element 16 and the upper end of the brake shoe 17 engages the stop element 16a, and during this movement the compensating elements 22 and 22a have rocked to the position shown in Fig. 4 and the tail elements 25 and 25a have engaged the links 23 and 24a to prevent further rocking motion of the elements 22 and 22a so that further pressure exerted by the cylinders 19 and 19a will produce a further effect of separating the brake shoes 17 and 17a for increased braking effect.

Now upon release of the hydraulic pressure the action of the springs 26, 27, 28 and 29 will return the brake shoes 17 and 17a to their non-braking, original position as shown in Fig. 1.

From the foregoing description, it is obvious that the entire face of the brake lining engages the brake drum during the braking period, consequently a materially increased braking effect is obtained over other types of brakes.

Referring to Fig. 5, the operation of the brake shoes, associated link elements, springs, etc., is identical to that previously described. The only difference in the device shown in Fig. 5 and the device shown in the other figures of the drawings is that the force operating the brake shoes is mechanical instead of hydraulic, and is shown only for the purpose of illustrating a mechanical device instead of hydraulic.

The operation of the illustrated mechanical device is as follows;—To put on the brake, the rod 50 is pulled to the right thereby rocking the lever 49 to the right and the gear segment 47 downwardly. The gear segment 47 drives the cam ring 42 in an anti-clockwise direction whereupon the cams 43 and 44 drive the push rods 21x and 21y outwardly to apply the brake as previously described.

Such modifications may be employed as lie within the scope of the appended claims, without departing from the spirit and intention of the invention. Now having fully described my invention, what I claim as new, and desire to secure by Letters Patent is;

1. In a brake device of the kind described; in combination, an axle housing and a brake mechanism carrying element thereon; a revolvable brake drum, said brake drum enveloping said brake mechanism; said brake mechanism comprising a plurality of brake shoes, brake linings on said brake shoes, said brake shoes being carried in slide guide elements and suspended on springs, means for the simultaneous movement in opposite direction of said brake shoes to a point where the entire face of the brake lining on said brake shoes will engage the brake drum for braking purposes, the adjacent ends of said brake shoes being connected by toggle elements at which points power for operating the brake device is applied, compensating elements associated with said toggle elements, and means for limiting the movement of said compensating elements as and for the purposes described.

2. In a brake device of the kind described; as in claim 1; one end of said springs being attached to said compensating elements, the other end of said springs being attached to stationary elements on the brake mechanism carrying element.

CECIL H. ROBB.